(No Model.)

H. W. LIBBEY.
FLEXIBLE ELECTRIC CONDUCTOR.

No. 459,385. Patented Sept. 8, 1891.

Witnesses.
J George Peltzer
Charlotte Planta

Inventor.
Horea W. Libbey
by Edwin Planta
Attorney

UNITED STATES PATENT OFFICE.

HOSEA W. LIBBEY, OF BOSTON, MASSACHUSETTS.

FLEXIBLE ELECTRIC CONDUCTOR.

SPECIFICATION forming part of Letters Patent No. 459,385, dated September 8, 1891.

Application filed July 26, 1889. Serial No. 318,740. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Flexible Conduits for Electric Wires, of which the following, taken in connection with the accompanying drawings, is a specification.

The object of my invention is to produce a flexible conduit for electric wires and to lay the same so as to prevent all deleterious contacts.

The invention consists in placing upon the electric wire oblong beads of glass or other non-conducting material with rounding ends and inserting them into an india-rubber or other flexible tube, as hereinafter fully described, and pointed out in the claims.

Figure 1:
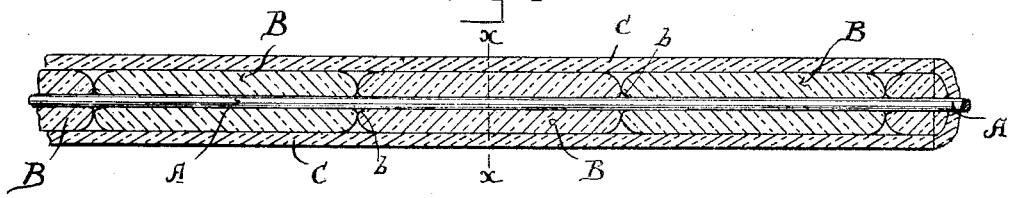
Figure 2:
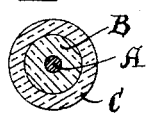
Figure 3:
Figure 4:
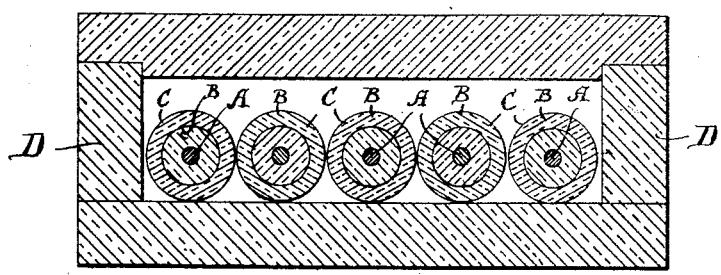
Figure 5:
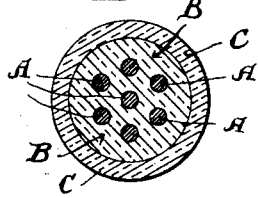
Figure 6:
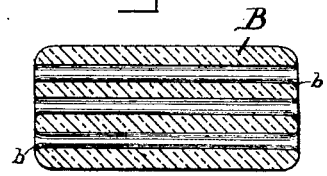

Referring to the accompanying drawings, Figure 1 represents a longitudinal section of a portion of an electric conduit embodying my invention. Fig. 2 is a transverse section taken on line X X of Fig. 1. Fig. 3 is a view of one of the beads. Fig. 4 is a transverse section through a trough containing a single row of conduits. Fig. 5 is a cross-section of a conduit in which the beads are adapted to receive several wires. Fig. 6 is a longitudinal section of one of the beads adapted to receive several wires.

A represents the electric wire, B B beads of glass or other non-conducting material strung thereon, and C a tube, of india-rubber or other flexible material, surrounding the same. By making the beads cylindrical they can be slipped into the flexible tube or covering one after the other without any particular arrangement and the exterior of the conduit will be substantially smooth and even, whereas if buttons were used they would be apt to turn flatwise or edgewise in the covering and thus obstruct each other, and the spaces or depressions between them would be so frequent as to make a very rough and uneven surface on the covering, which would interfere with the putting them into or taking a single one out of a conduit containing a great many of the single ones. The same trouble would exist if the buttons were placed at a distance from each other upon the wires unless the tube or covering were filled with some other substance between the buttons to fill out the tube even with the edges of the buttons, and also to keep the buttons at their proper distances apart; but such a process is virtually impossible with a conduit for a single wire, owing to the inability of getting any substance between the edges of the buttons and the covering in passing from one space to the other, and besides this the buttons must be wedged or otherwise secured to the wire to keep them properly spaced, which is not necessary with elongated cylindrical beads; but in using cylindrical beads which abut against each other in a flexible tube or covering it is necessary to make the ends of the beads rounding, in order that the conduit may be bent without increasing the length of the conduit or breaking the corners or edges of the beads, and especially if they are made of glass, which is the most preferable material; and, again, in using cylinders instead of beads it is evident that the wire must bend or flex at each joint sufficiently to compensate for the length of the bead in which the wire must remain straight. This excessive bend of the wire at each joint in making a curve would have a tendency to chip or break off the bead around the end of the bore or hole through the bead, or if the bead did not break the sharp edge or corner would cut or dent the wire, and thus weaken it. To avoid these difficulties I make the end of the bead with a depression or cavity $b$ around the end of the hole or bore of the bead. This concavity, or "countersink," as it might be called, will increase the distance between the ends of the smaller portions of the bores of any two contiguous beads, and consequently a portion of the wire between any two beads is left free to bend, which will permit of its making more of a curve than would be possible without such depression, and especially so by making the walls of the cavities rounding.

Another advantage arising from making the cavity in the ends of the beads is had in introducing a wire into the conduit—as, for instance, if a portion of the wire is defective or from any other cause it must be removed and be replaced by another. Under such circumstances the end of the wire is guided into the bores of the different beads without any liability of its being caught or stopped by any sharp corners or edges, as would be the case if the ends of the holes were not countersunk or provided with the depression or cavity.

As above described, when the cable is straight the contiguous ends of the adjacent beads will contact with each other at a point between the hole for the wire and the periphery of the bead, but will not be in contact directly around the hole nor at the periphery. In beads having only one hole, and that directly through the center, this contact point will be circular or annular and will be located between the central hole and the periphery. This construction will cause this contact point to act as a fulcrum in bending the wire in any direction whatever, and the rounded edge at the periphery will permit the ends of the beads to rock or roll outward upon each other without moving them longitudinally, and the reduced portion around the hole will permit the wire to move outward and follow or keep at substantially the same distance from the point of contact as it moves outward with the bending of the conduit.

Each wire being inclosed within a conduit of its own can be easily handled, bent to any desired curve, and is thoroughly insulated from atmospheric or other deleterious influences. When the conduits and wires are to be laid underground, I inclose them within a water-proof trough D, as shown in Fig. 4.

In Fig. 5 I have shown a cross-section of a conduit in which the beads are formed to receive seven wires, and in Fig. 6 I have shown a longitudinal section of one of the said beads; but beads may be formed with holes to receive a greater or smaller number of wires, as may be required.

What I claim as my invention is—

1. A flexible conduit for electric wires, consisting of a flexible tube or covering and a series of perforated elongated cylinders of non-conducting material abutting against each other within the covering, the ends of the beads being rounded at the periphery and provided with a depression around the perforations, whereby the contacting point between the beads is located between the perforations and the periphery of the beads and acts as a fulcrum and the wire is permitted to move in the direction of the contact point when the wire is bent, substantially as described.

2. A flexible conduit for electric wires, consisting of a flexible tube or covering and a series of centrally-perforated elongated cylindrical beads of non-conducting material abutting against one another within the covering, the ends of the beads being rounded at the periphery and provided with a depression or cavity around the hole, whereby the point of contact between the adjacent beads is annular and is located between the perforation and the periphery of the bead and acts as a movable fulcrum when the conduit is bent, substantially as described.

In testimony whereof I have signed my name to this specification, in the presence of two subscribing witnesses, on this 27th day of June, A. D. 1889.

HOSEA W. LIBBEY.

Witnesses:
CHAS. STEERE,
EDWIN PLANTA.